INVENTOR.
HIROSHI HASHIMOTO
BY
Webb, Burden, Robinson & Webb.

SIGNAL I (6a)

SIGNAL II (6b)

SIGNAL I + SIGNAL II

SIGNAL I - SIGNAL II

SIGNAL II - SIGNAL I

United States Patent Office 3,329,813
Patented July 4, 1967

3,329,813
BACKSCATTER ELECTRON ANALYSIS APPARATUS TO DETERMINE ELEMENTAL CONTENT OR SURFACE TOPOGRAPHY OF A SPECIMEN
Hiroshi Hashimoto, Ota-ku, Tokyo, Japan, assignor to Nihon Denshi Kabushiki Kaisha, Tokyo, Japan, a corporation of Japan
Filed Aug. 25, 1964, Ser. No. 391,969
4 Claims. (Cl. 250—49.5)

This invention relates to an improved method and apparatus for measuring the physical and chemical properties and the surface geometrical reliefs of solid materials by studying back-scattered electrons reflected from the surface of a specimen during electron bombardment.

Conventional electron probe X-ray microanalyzers, electron scanning microscopes, etc., effect observations of a given specimen by measuring the fraction of back-scattered electrons resulting from electron beam bombardment. Such fraction of backscattered electrons is dependent on the composition and topography of the specimen surface. In these measurements, the fraction of back-scattered electrons is determined by employing a single detector which is stationed at a fixed position above the specimen. Accordingly, in conventional apparatus, it is impossible to separate the information relating to physical properties and composition from the information relating to the topography of the specimen surface, and, therefore, accurate and precise measurements and observations of the specimen surface cannot be achieved.

The apparatus and method of the present invention overcomes this difficulty through the use of multiple detectors and by conveying the information detected by each said detector to a computing circuit where the information is computed in a manner to provide accurate separate information relating to specimen composition and to surface topography.

It will be appreciated that when a flat specimen surface is irradiated by an electron beam and two or more detectors disposed to detect backscattered electrons are substantially symmetrically arranged with respect to the incident beam axis, each respective fraction of backscattered electrons which are detected by each respective detector will be substantially equal. This is true regardless of the sample composition. However, when the specimen surface is irregular, the backscattered electrons do not reflect symmetrically with respect to the incident beam axis, and consequently, the fractions of backscattered electrons observed by each respective detector differs.

When two detectors are placed symmetrically with respect to an incident electron beam axis, the signal from each detector varies in a complementary manner in respect to the signal from the other detector according to the surface topography of the specimen. In accordance with the method and apparatus of the present invention, the signals from each detector are added so that signals relating to surface topography cancel each other out and the only signal remaining relates to the physical properties and composition of the specimen. Additionally, a signal relating to the surface topography alone is obtained by subtracting one of the output signals from the other.

The present invention may be effectively employed even if the detectors are not exactly symmetrically positioned in respect to the axis of incident beam or, for example, the specimen is tilted or even in the event the characteristics of the respective detectors themselves differ. In each such instance, the same results may be obtained as where detectors of the same characteristics are symmetrically positioned in respect to the beam axis by adjustments of the output signals of the detectors.

Thus, this invention makes it possible to determine the surface topography and the composition of a specimen by adding or subtracting output signals, since the respective signals relating to surface composition indicate the same variation in the respective detectors while the signals corresponding to surface topography have complementary variations.

Figure 1:
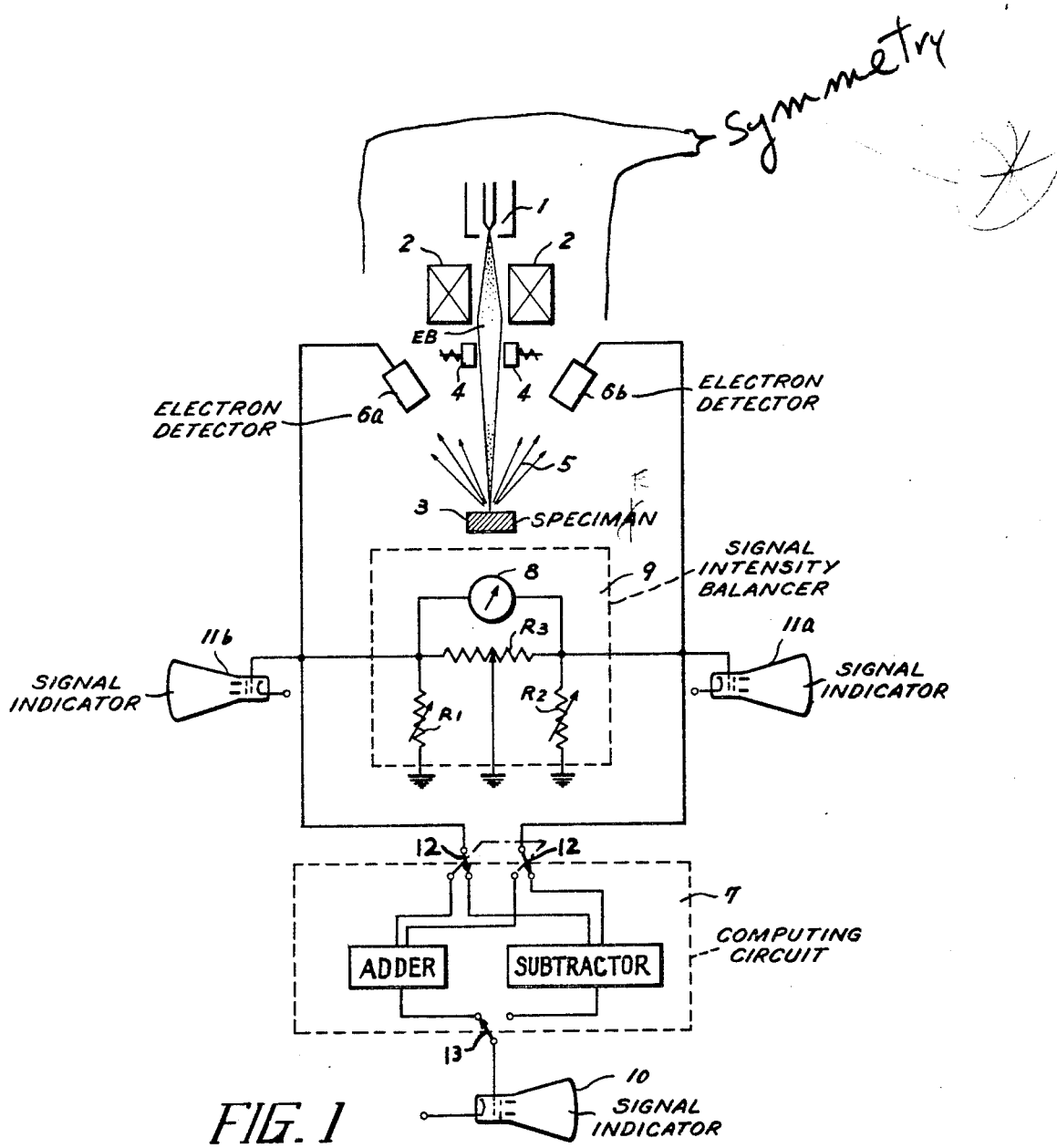
FIGURE 1 shows an illustrative embodiment of the apparatus of the present invention.
Figure 3:
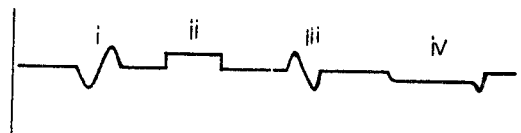
Figure 4:
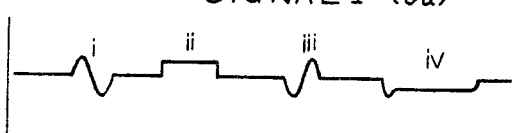

FIGURES 3 and 4 illustrate the relationship between the position of the electron probe and the output signal of the two detectors 6a and 6b of FIGURE 1.

Figure 2:
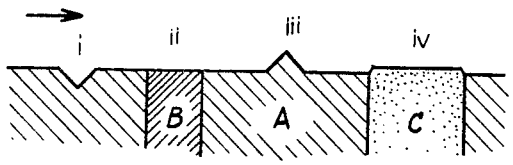
FIGURE 2 is an illustrative cross-sectional view of the specimen 3 irradiated by the apparatus of FIGURE 1 showing variations in surface topography and chemical compositions and is employed to explain the method of the present invention.
Figure 5:
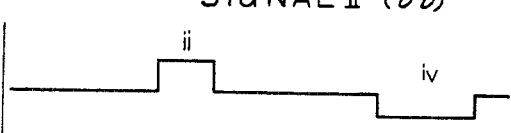

FIGURE 5 is a schematic diagram of a combined signal corresponding to the composition of the specimen of FIGURE 2.

Figure 6:
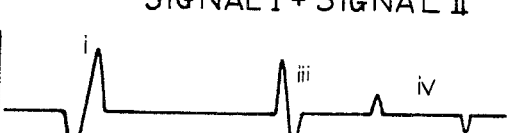
Figure 7:
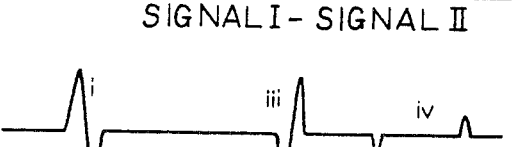

FIGURES 6 and 7 show combined complementary signals corresponding to the surface topography of the specimen of FIGURE 2.

In FIGURE 1 of the drawings, an electron beam EB emitted from an electron gun 1 is focused by the lens 2 onto the surface of a specimen 3. A deflecting lens 4 is mounted above the specimen surface to deflect the beam EB and effect scanning of the specimen surface. Reflected electrons resulting from electron bombardment of the specimen surface is illustrated by the arrow 5. The detectors 6a and 6b are substantially symmetrically positioned with respect to the incident beam axis above the specimen surface for detecting backscattered electrons.

Electron fractions detected by the respective detectors are fed into a conventional computing circuit 7. Computing circuit 7 is also connected to a signal intensity balancer 9 which consists of resistors $R_1$, $R_2$, a variable resistor $R_3$ and an ammeter 8. The balancer 9 serves to correct asymmetry of signals caused by differing characteristics and position of the two detectors. Asymmetry of the signals from detectors 6a and 6b is corrected by adjusting the variable resistor $R_3$ so as to make the value of the ammeter read 0 after $R_1$ and $R_2$ have been set at predetermined equal values.

This adjustment having been accomplished, the detected variations of the backscattered electron fractions are converted into electric signals by the detectors 6a and 6b. These signals are conducted into the computing circuit 7 where they are added by an adder or subtracted by a subtractor by positioning switches 12 and 13 to thereby obtain information as to the composition or surface topography of the specimen. The resultant computation or signal may be read on the indicator 10.

It is, of course, possible to make observations and obtain information from the signals generated by each projector independently from the indicators 11a and 11b (FIGURE 1). Each such measurement is the equivalent of employing a conventional detector system.

FIGURE 2 shows an enlarged sectional view of specimen 3 which is composed of different elements A, B, and C, and which does not have a flat surface. For example, the atomic numbers of the elements A, B and C are in the order C<A<B. When the specimen is scanned by the electron probe, the signals detected by the respective detectors 6a and 6b will be as shown in FIGURES 3 and 4 as Signal I for detector 6a and Signal II for detector 6b, respectively.

In the graphs of FIGURES 3–7, respectively, the position at which the electron probe bombards the specimen surface is represented by the abscissa of each, and the signal intensity generated by the detector when the electron probe bombards the specimen surface is represented by the ordinate.

When the specimen shown by FIGURE 2 is scanned by the electron probe in the direction of the arrow, it initially falls on the surface irregularity $i$. When it first encounters the downward sloping left edge to the bottom of the valley of this irregularity, the back-scattered electron fraction detected by detector $6a$ decreases while the fraction detected by the detector $6b$ increases. When the electron probe encounters the upward sloping right edge, from the bottom of the valley of the irregularity $i$, the fraction detected by the detector $6a$ increases and that detected by detector $6b$ decreases. Accordingly, the Signals I and II emitted by detectors $6a$ and $6b$, respectively, show complementary variations as illustrated by FIGURES 3 and 4.

When the resolved electron beam reaches the part $ii$, i.e., where the composition changes from element A to element B but there are no topographical changes, the fraction of backscattered electrons detected by both detectors $6a$ and $6b$ increases abruptly as is illustrated by the part $ii$ of Signals I and II (FIGURES 3 and 4). This is due to the fact that the backscattered electron fraction will become greater as the atomic number becomes larger.

Since irregularity $iii$ is a hill rather than a valley, such as irregularity $i$, it is obvious that Signals I and II of FIGURES 3 and 4 which are generated by the backscattered electron fraction will vary inversely to the corresponding signals caused by irregularity $i$.

However, the irregularity of hill part $iv$ which is composed of the element C involves obtaining information relating to both the composition and the topography of the specimen surface. In the ascending part of hill $iv$ of FIGURE 2, the fraction of the backscattered electrons which are detected by the detector $6a$ decreases as shown by FIGURE 3. This is due to the fact that the backscattered electron fraction corresponding to element C is less than that corresponding to element A, and although the backscattered electron fraction dependent upon or relating to the topography of the specimen, i.e., the ascending portion of hill $iv$, increases, the decrease in backscattered electrons caused by the lower atomic number of element C over element A overcomes such an increase. Therefore, the resulting obtained signal, as indicated by FIGURE 3, decreases. On the other hand, when the electron beam engages the descending part of the hill $iv$, the backscattered electron fraction detected by detector $6a$ decreases abruptly (see FIGURE 3), since the backscattered electron fraction influenced by topography decreases while the decreased fraction caused by the lower atomic number of the element C over element A continues. When the electron beam re-engages a portion of the specimen corresponding in chemistry to part A and to the flat surface of the specimen, the signal from the detector $6a$ returns to what it was immediately prior to engaging hill $iv$.

The signal detected by detector $6b$ (Signal II, FIGURE 4) when the electron beam engages irregularity $iv$ is complementary to Signal I (FIGURE 3) in respect to topography and is similar in respect to the physical and chemical properties of the specimen.

Either Signal I or Signal II of FIGURES 3 and 4 would be difficult to interpret in the light of the dual effects of both topography and chemistry on their shape.

If both signals are conducted through an analog computer (FIGURE 1) and added, the combined signal as viewed on indicator 10 is substantially what is shown by FIGURE 5. The effects of topography on the two signals cancel each other.

In part $ii$ of each signal, the signals are not complementary but instead are substantially the same, and as a consequence, these signals magnify one another when added. The part $iv$ of Signals I and II cancel out the complementary effects caused by topography and add the effects caused by physical properties and chemistry so that the resultant signal is as shown by FIGURE 5. It will be appreciated that the chemical changes shown by the combined signals of FIGURE 5 are preferable to that of Signals I or II alone, as shown by FIGURES 3 and 4, in determining such chemical properties.

If the switches 12 and 13 of the apparatus of FIGURE 1 are set to conduct both Signals I and II through the subtractor of the computer and Signal II is subtracted from Signal I, the result is as shown by FIGURE 6. In this signal, part $ii$ of Signal II is subtracted from part $ii$ of Signal I, and since these are of substantially the same strength, the combined signal does not show their existence. The results of changes in topography, however, are magnified.

Subtracting Signal I from Signal II results in the signal illustrated by FIGURE 7.

It will be appreciated that either of the signals shown by FIGURE 6 or that illustrated by FIGURE 7 are far more useful in determining the topography of the specimen 3 than Signals I and II shown by FIGURES 3 and 4.

In accordance with the present invention, information relating to surface topography and compositions of a specimen can be independently obtained by computing the signals with a computing circuit. In other words, this invention makes it possible to eliminate the influence of surface topography and selecting information relating to composition only by adding Signal I to Signal II. Also, it is possible to obtain information relating to surface topography only by subtracting Signal I from Signal II and vice versa as shown by FIGURES 6 and 7.

The components of the apparatus of the present invention are well-known and commercially available apparatus and instruments. For example, an electron probe such as is illustrated by FIGURE 1 is a well-known, commercially available apparatus. The detectors $6a$ and $6b$ may be any of the commercially available detectors that are capable of generating a signal from electron impingement. We prefer to use a silicon crystal semi-conductor type of detector having the well-known P–N junction which generates a voltage and a current in a crystal through photovoltaic effect when it is irradiated. Indicators 10, 11a and 11b may be the cathode ray tubes of oscilloscopes. The computer system 7 can conveniently be the well-known analog computer.

While I have described the presently preferred embodiments of my invention, it is to be understood that it may be otherwise embodied within the scope of the following claims.

I claim:

1. Apparatus for determining the physical and chemical properties and the surface topography of a specimen comprising:
   (a) means for scanning the surface of said specimen with an electron beam;
   (b) a plurality of electron detectors substantially symmetrically positioned in respect to the beam axis above said specimen to detect backscattered electrons and generate signals proportional to the electrons detected; and
   (c) a computer for adding the signals from detectors on one side of the beam axis to signals from detectors on the other side of the beam axis to cancel out signals relating to the topography of the surface of the specimen and leave only a signal relating to the physical properties and composition of the specimen and for subtracting the signals from detectors on one side of the beam axis from signals from detectors on the other side of the beam axis to produce a signal relating only to the topography of the surface of the specimen.

2. The apparatus described in claim 1 and having means for adjusting the output signals of the detectors to compensate for variations in characteristics of the detectors relative to each other and in the positioning of the detectors relative to the specimen.

3. Apparatus for determining the physical and chemical properties of a specimen comprising:

(a) means for scanning the surface of said specimen with an electron beam;
(b) a plurality of electron detectors positioned above said specimen to detect backscattered electrons and generate signals that are substantially complementary to one another in respect to the topographical effects of the surface of said specimen; and
(c) a computer for adding the signals from detectors one one side of the beam axis to signals from detectors on the other side of the beam axis to cancel out signals relating to the topography of the surface of the specimen and leave only a signal relating to the physical properties and composition of the specimen and for subtracting the signals from detectors on one side of the beam axis from signals from detectors on the other side of the beam axis to produce a signal relating only to the topography of the surface of the specimen.

4. The apparatus described in claim 3 and having means for adjusting the output signals of the detectors to compensate for variations in characteristics of the detectors relative to each other and in the positioning of the detectors relative to the specimen.

References Cited

UNITED STATES PATENTS

| | | | |
|---|---|---|---|
| 3,103,584 | 9/1963 | Shapiro et al. | 250—49.5 |
| 3,204,095 | 8/1965 | Watanabe | 250—49.5 |

OTHER REFERENCES

The Encyclopedia of X-rays and Gamma Rays, published by Reinhold Publishing Corp., New York, July 1963, pp. 818 and 819.

RALPH G. NILSON, *Primary Examiner.*

W. F. LINDQUIST, *Assistant Examiner.*